(12) United States Patent
Tang

(10) Patent No.: US 10,613,353 B2
(45) Date of Patent: Apr. 7, 2020

(54) OPTICAL LENSES

(71) Applicant: ONELENSOLUTION OPTICAL TECHNOLOGY SDN BHD, Kuala Lumpur (MY)

(72) Inventor: Kuan Yew Tang, Kuala Lumpur (MY)

(73) Assignee: ONELENSOLUTION OPTICAL TECHNOLOGY SDN BHD, Kuala Lumpur (MY)

( * ) Notice: Subject to any disclaimer, the term of this patent is extended or adjusted under 35 U.S.C. 154(b) by 67 days.

(21) Appl. No.: 15/961,860

(22) Filed: Apr. 24, 2018

(65) Prior Publication Data

US 2018/0329232 A1    Nov. 15, 2018

(30) Foreign Application Priority Data

May 9, 2017    (TW) .............................. 106206569 U

(51) Int. Cl.
*G02C 7/10*    (2006.01)
*G02B 5/20*    (2006.01)
(Continued)

(52) U.S. Cl.
CPC .............. *G02C 7/104* (2013.01); *G02B 1/115* (2013.01); *G02B 1/14* (2015.01); *G02B 1/16* (2015.01);
(Continued)

(58) Field of Classification Search
CPC .......... G02C 7/104; G02C 7/022; G02C 7/10; G02C 7/107; G02C 7/12; G02B 5/20;
(Continued)

(56) References Cited

U.S. PATENT DOCUMENTS 4,896,928 A * 1/1990 Perilloux ............... G02B 5/285
359/359
4,931,315 A * 6/1990 Mellor ................... G02B 5/282
359/359

(Continued)

FOREIGN PATENT DOCUMENTS

TW            M311893 U      5/2007

*Primary Examiner* — Jordan M Schwartz
(74) *Attorney, Agent, or Firm* — J.C. Patents

(57) ABSTRACT

This invention relates to an optical lenses, which includes a lens substrate, a multi-layers film is set on one side of the lens substrate to block partial blue light and infrared light. The multi-layers film is formed by interactive stacking a plurality of layers of a low refractive index film (such as silicon dioxide film, the mix material film which is composed of silicon dioxide and alumina or the mix material film which is composed of silicon dioxide and silicon oxide) and a high refractive index film (such as zirconium dioxide film, trititanium pentoxide film, titanium dioxide film, tantalum pentoxide film or the mix material which is composed of zirconium dioxide and titanium dioxide), and each layer of film is used a specific thickness. So that, the optical lens can produce the effect of blocking partial blue light and infrared light without overly increased in color, allowing the user's eyes to keep cool due to partial infrared light blocking. Moreover, the optical lens can also reduce the user's eyes produce age related macular degeneration or cataract to achieve the effect of reduce eye fatigue and prolong vision view due to partial blue light blocking.

10 Claims, 4 Drawing Sheets

(51) Int. Cl.
    *G02B 5/28*         (2006.01)
    *G02B 1/115*       (2015.01)
    *G02B 1/16*         (2015.01)
    *G02B 1/14*         (2015.01)
    *G02B 1/18*         (2015.01)
    *G02B 13/14*       (2006.01)
    *G02C 7/12*         (2006.01)
    *G02B 1/10*         (2015.01)

(52) U.S. Cl.
    CPC ................. *G02B 1/18* (2015.01); *G02B 5/20* (2013.01); *G02B 5/28* (2013.01); *G02B 5/282* (2013.01); *G02B 5/285* (2013.01); *G02B 13/14* (2013.01); *G02C 7/107* (2013.01); *G02C 7/12* (2013.01); *G02B 1/10* (2013.01)

(58) Field of Classification Search
    CPC .......... G02B 5/208; G02B 5/28; G02B 5/282; G02B 5/285; G02B 13/14; G02B 1/10; G02B 1/115
    See application file for complete search history.

(56) References Cited

U.S. PATENT DOCUMENTS

| | | | |
|---|---|---|---|
| 2008/0037128 A1* | 2/2008 | Knapp | G02B 5/285 359/586 |
| 2009/0258223 A1* | 10/2009 | Ling | G02B 1/115 428/336 |
| 2018/0113326 A1* | 4/2018 | Gloege | G02B 1/10 |

* cited by examiner

OPTICAL LENSES

CROSS-REFERENCE TO RELATED APPLICATION

This application claims the priority benefit of Taiwan patent application serial no. 106206569, filed on May 9, 2017. The entirety of the above-mentioned patent application is hereby incorporated by reference herein and made a part of this specification.

TECHNICAL FIELD

This invention relates to an optical lenses, particularly to an optical lenses which can effectively block partial blue light and infrared light.

BACKGROUND ART

With the advancement of technology and the changing of human life habits, television, computers, tablets and smart phones and other electronic products and lighting equipment technology have become indispensable necessities in most people daily life. The screen light of said electronic products and said lighting equipment are both containing blue light, and outdoor sunlight is also containing high-energy of visible and non visible light. If the eyes are exposed to blue light for a long time, the blue light generate from electronic products will penetrate through eyeball to the iris and directly into the retina, and thus causes macular degeneration and/or cataracts.

The prior optical lenses, especially the optical lenses used for vision correction are focused on the function of anti-reflection, absorbing infrared and ultraviolet, eliminating static electricity, low-frequency radiation and glare, as disclosed in Taiwan Patent NO. M311893, an "Strengthening Lens" mainly includes a lens, said lens has at least one coating layer, said coating layer is coated on lens by chemical plating method (like immersion plating or spraying) or physical plating method (like vacuum evaporation or ion plating) making the coating layer have a radius of curvature which is the same with the surface of lens, and to let the lens with the effect of anti-reflective, high transmittance and high conductivity.

However, all the prior optical lenses never take into account the impact of blue light on the eyes. Therefore, all the optical lens coating techniques and methods used in the prior optical lenses can not block blue light and protect the eyes from damage by excessive blue light.

The purpose of this invention is to overcome the prior problem that optical lenses do not block blue light and infra-red light as a result after many years of research the following innovation is developed.

SUMMARY OF INVENTION

The purpose of this invention is to solve the prior technology issues for not being able to block blue light and infra-red light that helps to prevent age related macular degeneration and/or cataracts.

The optical lenses in the present invention includes at least a lens substrate and a multi-layers film which is set on one side of the lens substrate to block partial blue light and infrared light. The multi-layers film is formed by interactive stacking a plurality of layers of a low refractive index film (such as silicon dioxide film, the mix material film which is composed of silicon dioxide and alumina or the mix material film which is composed of silicon dioxide and silicon oxide) and a high refractive index film (such as zirconium dioxide film, trititanium pentoxide film, titanium dioxide film, tantalum pentoxide film or the mix material which is composed of zirconium dioxide and titanium dioxide), and each layer of film is used a specific thickness.

So that, the optical lens can produce the effect of blocking partial blue light and infrared light without overly increased in color, allowing the user's eyes to keep cool due to partial infrared light blocking. Moreover, the optical lens can also reduce the user's eyes produce age related macular degeneration or cataract to achieve the effect of reduce eye fatigue and prolong vision view due to partial blue light blocking.

DESCRIPTION OF EMBODIMENTS

Figure 1:
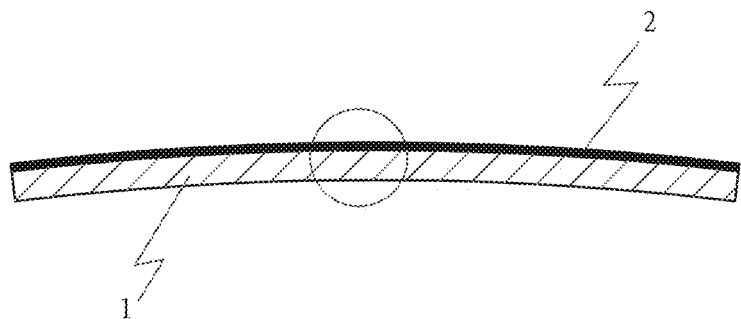
FIG. 1 is a cross-sectional view of the optical lenses in the present invention.
Figure 2:
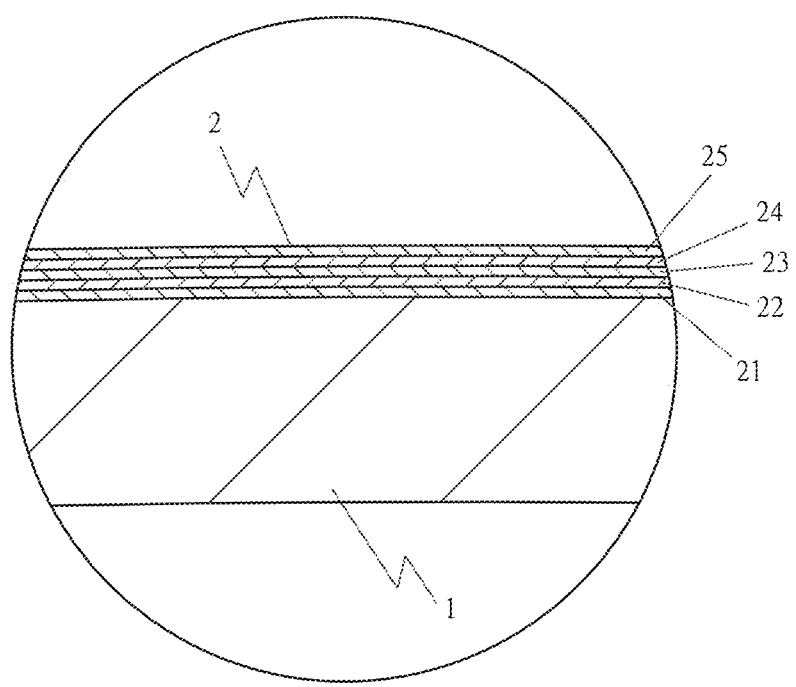
FIG. 2 is the first type partial enlargement view of the first embodiment of the optical lenses in the present invention.
Figure 3:
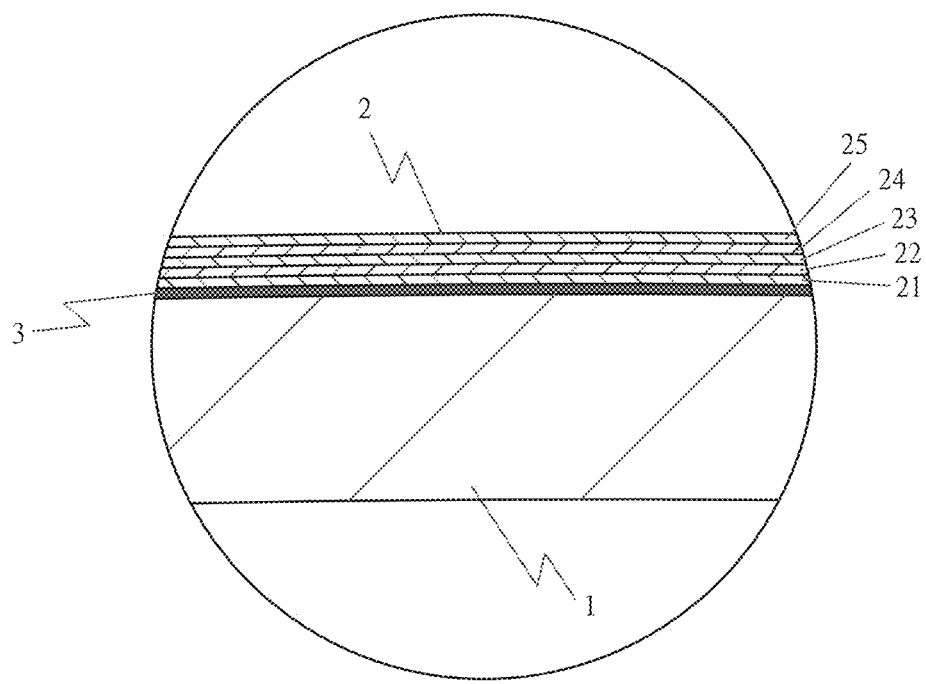
FIG. 3 is the second type partial enlargement view of the first embodiment of the optical lenses in the present invention.

The first preferred embodiment of the optical lenses in the present invention, as shown in FIGS. 1 to 4, includes at least a lens substrate 1 and a multi-layers film 2 as main components combined together, wherein:

The lens substrate 1 can be a convex lens, a concave lens, a myopic lens, a hyperopic lenses, an astigmatic lens, a presbyopia lens, a screen lens or other optical lenses made of glass, resin, polycarbonate (PC), acrylic, CR39, NK55, MR-Series (MR7, MR7.4, MR8, MR10 . . . etc), trivex (TRILOGY) or other materials, depending on demand. The lens substrate 1 can be pre-cut into a desired shape.

The multi-layers film 2 is provided on one side of the lens substrate 1, which is a five-layers film structure, each film of the multi-layers film 2 may be deposited on the lens substrate 1 directly or indirectly by vacuum deposition, the first film 21 of the multi-layers film 2 may be a silicon dioxide ($SiO_2$) film, a mix material film which is composed of silicon dioxide and alumina ($SiO_2+Al_2O_3$) or the mix material film which is composed of silicon dioxide and silicon oxide ($SiO+SiO_2$), and the thickness of the first film 21 of the multi-layers film 2 is 130~208 nm.

The second film 22 of the multi-layers film 2 may be a zirconium dioxide ($ZrO_2$) film, a trititanium pentoxide ($Ti_3O_5$) film, a titanium dioxide ($TiO_2$) film, a tantalum pentoxide ($Ta_2O_5$) film or a mix material which is composed of zirconium dioxide and titanium dioxide ($ZrO_2+TiO_2$), and the thickness of the second film 22 of the multi-layers film 2 is 101~152 nm.

The third film 23 of the multi-layers film 2 may be a silicon dioxide (SiO2) film, a mix material film which is composed of silicon dioxide and alumina (SiO2+Al2O3) or the mix material film which is composed of silicon dioxide and silicon oxide (SiO+SiO2), and the thickness of the third film 23 of the multi-layers film 2 is 120~184 nm.

The fourth film 24 of the multi-layers film 2 may be a zirconium dioxide (ZrO2) film, a trititanium pentoxide (Ti3O5) film, a titanium dioxide (TiO2) film, a tantalum pentoxide (Ta2O5) film or a mix material which is composed of zirconium dioxide and titanium dioxide (ZrO2+TiO2), and the thickness of the fourth film 24 of the multi-layers film 2 is 80~130 nm.

The fifth film 25 of the multi-layers film 2 may be a silicon dioxide (SiO2) film, a mix material film which is composed of silicon dioxide and alumina (SiO2+Al2O3) or the mix material film which is composed of silicon dioxide and silicon oxide (SiO+SiO2), and the thickness of the fifth film 25 of the multi-layers film 2 is 40~65 nm. In addition, at least one functional film may be provided between the adjacent two films, depending on demand.

The second preferred embodiment of the optical lenses in the present invention, as shown in FIGS. 1 and 5 to 7, includes at least a lens substrate 1 and a multi-layers film 2 as main components combined together, wherein:

The lens substrate 1 can be a convex lens, a concave lens, a myopic lens, a hyperopic lenses, an astigmatic lens, a presbyopia lens, a screen lens or other optical lenses made of glass, resin, polycarbonate (PC), acrylic, CR39, NK55, MR-Series (MR7, MR7.4, MR8, MR10 . . . etc), trivex (TRILOGY) or other materials, depending on demand. The lens substrate 1 can be pre-cut into a desired shape.

The multi-layers film 2 is provided on one side of the lens substrate 1, which is a seven-layers film structure, each film of the multi-layers film 2 may be deposited on the lens substrate 1 directly or indirectly by vacuum deposition, the first film 21 of the multi-layers film 2 may be a silicon dioxide (SiO2) film, a mix material film which is composed of silicon dioxide and alumina (SiO2+Al2O3) or the mix material film which is composed of silicon dioxide and silicon oxide (SiO+SiO2), and the thickness of the first film 21 of the multi-layers film 2 is 130~208 nm.

The second film 22 of the multi-layers film 2 may be a zirconium dioxide (ZrO2) film, a trititanium pentoxide (Ti3O5) film, a titanium dioxide (TiO2) film, a tantalum pentoxide (Ta2O5) film or a mix material which is composed of zirconium dioxide and titanium dioxide (ZrO2+TiO2), and the thickness of the second film 22 of the multi-layers film 2 is 101~152 nm.

The third film 23 of the multi-layers film 2 may be a silicon dioxide (SiO2) film, a mix material film which is composed of silicon dioxide and alumina (SiO2+Al2O3) or the mix material film which is composed of silicon dioxide and silicon oxide (SiO+SiO2), and the thickness of the third film 23 of the multi-layers film 2 is 120~184 nm.

The fourth film 24 of the multi-layers film 2 may be a zirconium dioxide (ZrO2) film, a trititanium pentoxide (Ti3O5) film, a titanium dioxide (TiO2) film, a tantalum pentoxide (Ta2O5) film or a mix material which is composed of zirconium dioxide and titanium dioxide (ZrO2+TiO2), and the thickness of the fourth film 24 of the multi-layers film 2 is 75~114 nm.

The fifth film 25 of the multi-layers film 2 may be a silicon dioxide (SiO2) film, a mix material film which is composed of silicon dioxide and alumina (SiO2+Al2O3) or the mix material film which is composed of silicon dioxide and silicon oxide (SiO+SiO2), and the thickness of the fifth film 25 of the multi-layers film 2 is 11~18 nm.

The sixth film 26 of the multi-layers film 2 may be a zirconium dioxide (ZrO2) film, a trititanium pentoxide (Ti3O5) film, a titanium dioxide (TiO2) film, a tantalum pentoxide (Ta2O5) film or a mix material which is composed of zirconium dioxide and titanium dioxide (ZrO2+TiO2), and the thickness of the sixth film 26 of the multi-layers film 2 is 9~13 nm.

The seventh film 27 of the multi-layers film 2 may be a silicon dioxide (SiO2) film, a mix material film which is composed of silicon dioxide and alumina (SiO2+Al2O3) or the mix material film which is composed of silicon dioxide and silicon oxide (SiO+SiO2), and the thickness of the seventh film 27 of the multi-layers film 2 is 2.8~4.2 nm. In addition, at least one functional film may be provided between the adjacent two films, depending on demand.

As shown in FIGS. 3, 4, 6 and 7, each of the foregoing embodiment of the optical lenses may be provided with a first combined film 3 between the lens substrate 1 and the multi-layers film 2, the thickness of the first combined film 3 is 4.8~7.2 nm, so that the multi-layers film 2 can be easily attached to the lens substrate 1 to enhance the bonding strength between the lens substrate 1 and the multi-layers film 2 and to make the multi-layers film 2 not easy away from the lens substrate 1 due to the external force. By the way, the first combined film 3 will not affect the effect of the optical lenses blocking partial blue light and infrared light, so that the place between the lens substrate 1 and the multi-layers film 2 may be provided with or without the first combined film 3. The first combined film 3 may be a chromium (Cr) film, a silicon (Si) film, a silicon oxide (SiO) film or the mix material film which is composed of silicon oxide and chromium (SiO+Cr).

Figure 4:
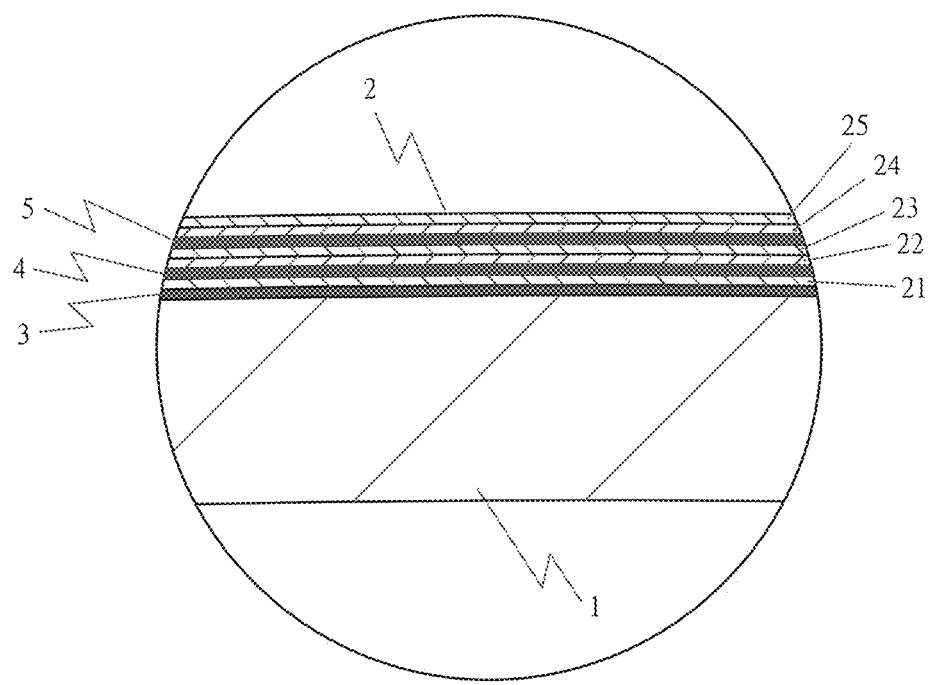
FIG. 4 is the third type partial enlargement view of the first embodiment of the optical lenses in the present invention.
Figure 5:
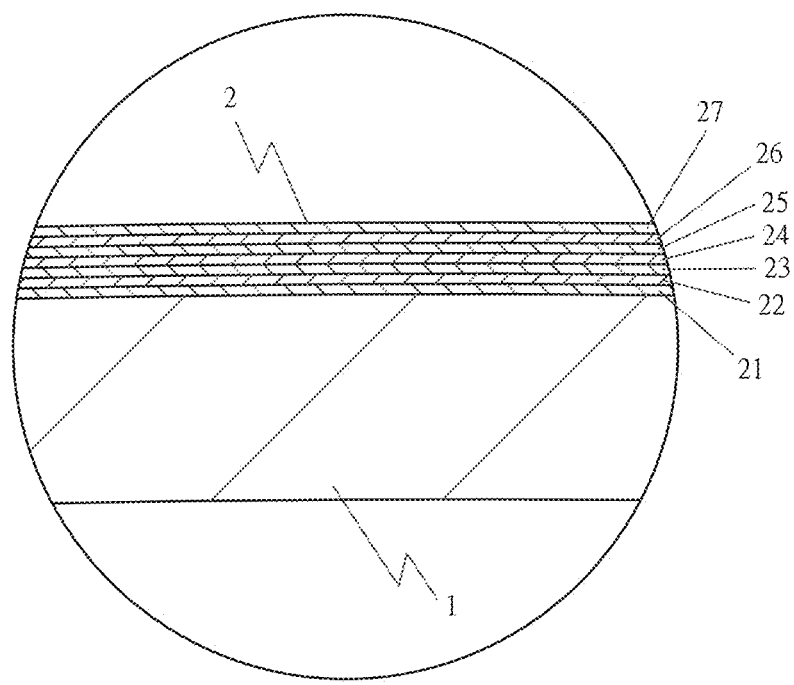
FIG. 5 is the first type partial enlargement view of the second embodiment of the optical lenses in the present invention.
Figure 6:
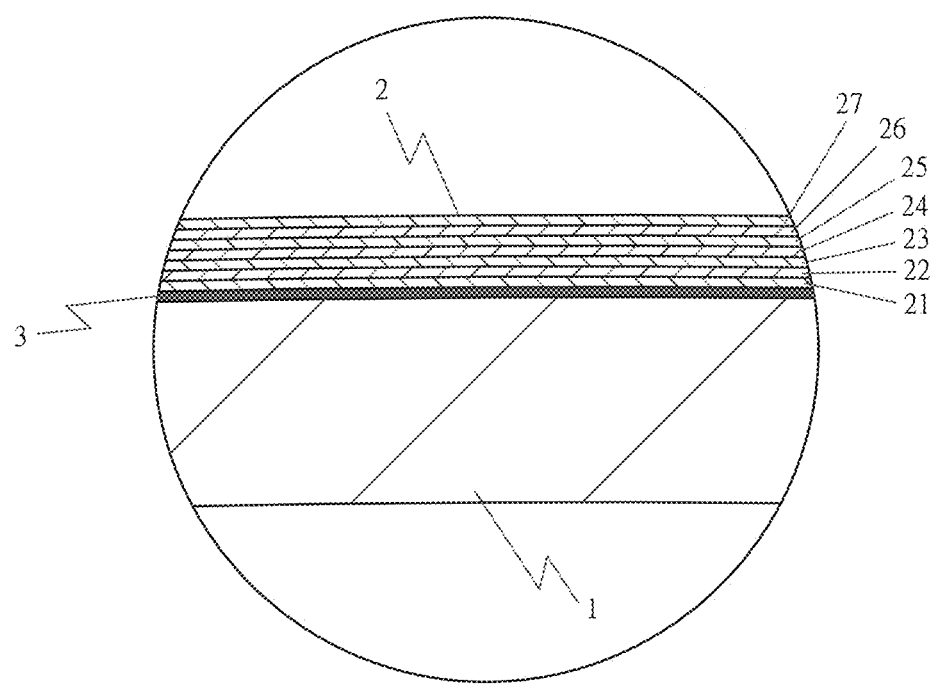
FIG. 6 is the second type partial enlargement view of the second embodiment of the optical lenses in the present invention.
Figure 7:
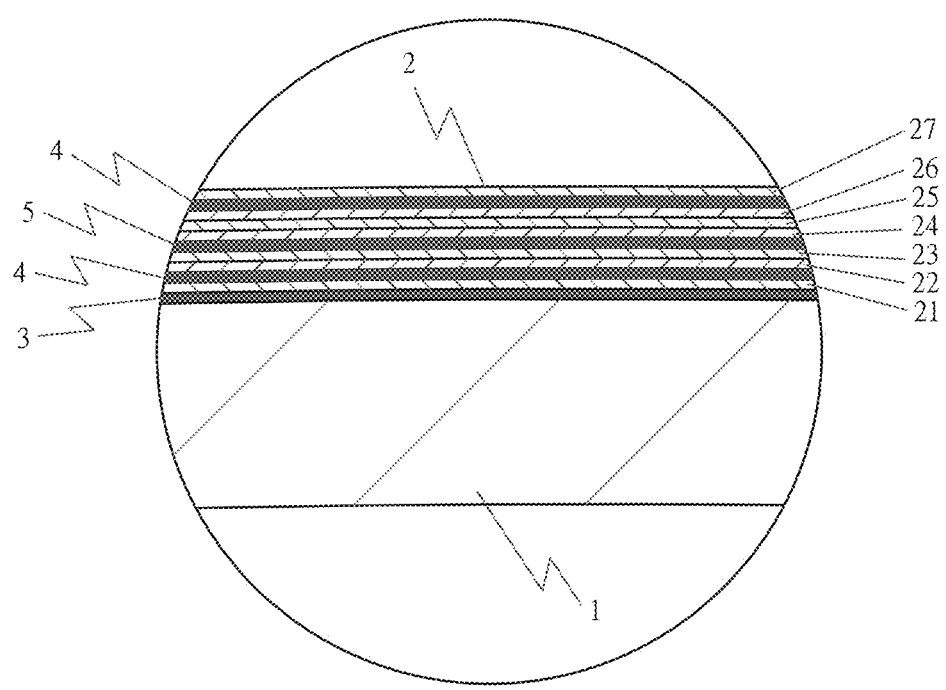
FIG. 7 is the third type partial enlargement view of the second embodiment of the optical lenses in the present invention.

As shown in FIGS. 4 and 7, at least one place between the adjacent film of the multi-layers film 2 may be provided with a second combined film 4 (such as the place between the first film 21 and the second film 22, the place between the second film 22 and the third film 23, the place between the third film 23 and the fourth film 24, the place between the fourth film 24 and the fifth film 25, the place between the fifth film 25 and the sixth film 26, or the place between the sixth film 26 and the seventh film 27), the second combined film 4 can increase the adhesion and the bonding strength between the adjacent film of the multi-layers film 2 and to make the multi-layers film 2 not easy away from the lens substrate 1 due to the external force. By the way, the second combined film 4 will not affect the effect of the optical lenses blocking partial blue light and infrared light, so that the place between the adjacent film of the multi-layers film 2 may be provided with or without the second combined film 4. The second combined film 4 may be an alumina (Al2O3) film.

As shown in FIGS. 4 and 7, an antistatic film 5 (or conductive film) may be provided between the adjacent film of the multi-layers film 2, the thickness of the antistatic film 5 is 2~9 nm, so that the optical lenses has the effect of anti-static function. As the first combined film 3 and the second combined film 4, the antistatic film 5 will not affect the effect of the optical lenses blocking partial blue light and infrared light, so that the place between the adjacent film of the multi-layers film 2 may be provided with or without the antistatic film 5. The antistatic film 5 may be an Indium Tin Oxide (ITO) film.

At least one functional film (such as oleophobic film, antifogging film, protective film and so on) may be set on the outside of the multi-layers film 2 (not shown) to increase the functionality of the optical lens, depending on demand.

According to the test results, the optical lens of the present invention has a reflectance of blue light (wavelengths 476 to 495 nm) of about 5~20%, a reflectance of infrared light (wavelengths 760 to 1000 nm) of about 30~70%, a transmittance of blue light (wavelengths 476 to 495 nm) of about 80~95% and a transmittance of infrared light (wavelengths 760 to 1000 nm) of about 30~70%.

Undoubtedly, the multi-layers film 2 also may be a nine-layers film structure, a eleven-layers film structure, a thirteen-layers film structure or other odd layers film structure, but the number of layers of the multi-layers film 2 is larger and the thickness of each layer film must be adjusted to a thinner thickness, so that the manufacture of optical lenses is more difficult and prone to defects, and it will also increase the manufacturing costs. For this reason, based on the results of the inventor's studies, the foregoing five-layers film structure and seven-layers film structure of the first and second embodiment have the best production efficiency and yield, even if the first combined film 3, the second combined film 4, the antistatic film 5, the oleophobic film, the anti-fogging film, the protective film or other functional film are added to the optical lens, the effect of the optical lenses blocking partial blue light and infrared light will not be affected at all.

In view of the above, the optical lens of the present invention uses a plurality of specific material and thickness in each film of the multi-layers film 2 to produce the effect of blocking partial blue light and infrared light without overly increased in color, allowing the user's eyes to keep cool due to partial infrared light blocking. Moreover, the optical lens can also reduce the user's eyes produce age related macular degeneration or cataract to achieve the effect of reduce eye fatigue and prolong vision view due to partial blue light blocking. Evidently this invention has tangible benefits and tallies with progressiveness and novelty demanded by patent laws.

While the preferred embodiments of this invention have been described above, it will be recognized and understood that various modifications may be made therein and appended claims are intended to cover all such modifications that may fall within the spirit and scope of the invention.

REFERENCE SIGNS LIST lens substrate 1, multi-layers film 2, first film 21, second film 22, third film 23, fourth film 24, fifth film 25, sixth film 26, seventh film 27, first combined film 3, second combined film 4, and antistatic film 5.

What is claimed is:

1. An optical lens comprising:
a lens substrate; and
a multi-layers film, which is provided on one side of the lens substrate, the multi-layers film is a five-layers film structure, each film of the multi-layers film is deposited on the lens substrate directly or indirectly by vacuum deposition; wherein:
the first film of said multi-layers film is one of: a silicon dioxide film, a mix material film which is composed of silicon dioxide and alumina, or a mix material film which is composed of silicon dioxide and silicon oxide, and a thickness of the first film of the multi-layers film is in the range of 130 to 208 nm;
the second film of said multi-layers film is one of: a zirconium dioxide film, a trititanium pentoxide film, a titanium dioxide film, a tantalum pentoxide film, or a mix material film which is composed of zirconium dioxide and titanium dioxide, and a thickness of the second film of the multi-layers film is in the range of 101 to 152 nm;
the third film of said multi-layers film is one of: a silicon dioxide film, a mix material film which is composed of silicon dioxide and alumina, or a mix material film which is composed of silicon dioxide and silicon oxide, and a thickness of the third film of the multi-layers film is in the range of 120 to 184 nm;
the fourth film of said multi-layers film is one of: a zirconium dioxide film, a trititanium pentoxide film, a titanium dioxide film, a tantalum pentoxide film, or a mix material film which is composed of zirconium dioxide and titanium dioxide, and a thickness of the fourth film of the multi-layers film is in the range of 80 to 130 nm; and
the fifth film of said multi-layers film is one of: a silicon dioxide film, a mix material film which is composed of silicon dioxide and alumina, or a mix material film which is composed of silicon dioxide and silicon oxide, and a thickness of the fifth film of the multi-layers film is in the range of 40 to 65 nm, wherein the multi-layers film is so constructed so that, with the multi-layers film, the optical lens can reflect blue light and infrared light at the same time.

2. An optical lens comprising:
a lens substrate; and
a multi-layers film, which is provided on one side of the lens substrate, the multi-layers film is a seven-layers film structure, each film of the multi-layers film is deposited on the lens substrate directly or indirectly by vacuum deposition; wherein:
the first film of said multi-layers film is one of: a silicon dioxide film, a mix material film which is composed of silicon dioxide and alumina, or a mix material film which is composed of silicon dioxide and silicon oxide, and a thickness of the first film of the multi-layers film is in the range of 130 to 208 nm;
the second film of said multi-layers film is one of: a zirconium dioxide film, a trititanium pentoxide film, a titanium dioxide film, a tantalum pentoxide film, or a mix material film which is composed of zirconium dioxide and titanium dioxide, and a thickness of the second film of the multi-layers film is in the range of 101 to 152 nm;
the third film of said multi-layers film is one of: a silicon dioxide film, a mix material film which is composed of silicon dioxide and alumina, or mix material film which is composed of silicon dioxide and silicon oxide, and a thickness of the third film of the multi-layers film is in the range of 120 to 184 nm;
the fourth film of said multi-layers film is one of: a zirconium dioxide film, a trititanium pentoxide film, a titanium dioxide film, a tantalum pentoxide film, or a mix material film which is composed of zirconium dioxide and titanium dioxide, and a thickness of the fourth film of the multi-layers film is in the range of 75 to 114 nm;
the fifth film of said multi-layers film is one of: a silicon dioxide film, a mix material film which is composed of silicon dioxide and alumina, or mix material film which is composed of silicon dioxide and silicon oxide, and a thickness of the fifth film of the multi-layers film is in the range of 11 to 18 nm;
the sixth film of said multi-layers film is one of: a zirconium dioxide film, a trititanium pentoxide film, a titanium dioxide film, a tantalum pentoxide film, or a mix material film which is composed of zirconium dioxide and titanium dioxide, and a thickness of the sixth film of the multi-layers film is in the range of 9 to 13 nm; and the seventh film of said multi-layers film is one of: a silicon dioxide film, a mix material film which is composed of silicon dioxide and alumina, or mix material film which is composed of silicon dioxide and silicon oxide, and a thickness of the seventh film of the multi-layers film is in the range of 2.8 to 4.2 nm, wherein the multi-layers film is so constructed so that, with the multi-layers film, the optical lens can reflect blue light and infrared light at the same time.

3. An optical lens as claimed in claim 1, wherein a first combined film is provided between said lens substrate and said multi-layers film; the first combined film is one of: a chromium film, a silicon film, a silicon oxide film, or a mix material film which is composed of silicon oxide and chromium, and a thickness of the first combined film is in the range of 4.8 to 7.2 nm.

4. An optical lens as claimed in claim 1, wherein at least one place between two adjacent films of the multi-layers film is provided with a second combined film, the second combined film is an alumina film.

5. An optical lens as claimed in claim 1, wherein an antistatic film is provided between two adjacent films of the multi-layers film, a thickness of the antistatic film is in the range of 2 to 9 nm, and the antistatic film is an Indium Tin Oxide film.

6. An optical lens as claimed in claim 1, wherein an outside surface of the multi-layers film is provided with at least one of: an oleophobic film, an antifogging film, or a protective film.

7. An optical lens as claimed in claim 2, wherein a first combined film is provided between said lens substrate and said multi-layers film; the first combined film is one of: a chromium film, a silicon film, a silicon oxide film, or a mix material film which is composed of silicon oxide and chromium, and a thickness of the first combined film is in the range of 4.8 to 7.2 nm.

8. An optical lens as claimed in claim 2, wherein at least one place between any two adjacent films of the multi-layers film is provided with a second combined film, the second combined film is an alumina film.

9. An optical lens as claimed in claim 2, wherein an antistatic film is provided between two adjacent films of the multi-layers film, a thickness of the antistatic film is in the range of 2 to 9 nm, and the antistatic film is an Indium Tin Oxide film.

10. An optical lens as claimed in claim 2, wherein an outside surface of the multi-layers film is provided with at least one of: an oleophobic film, an antifogging film, or a protective film.

* * * * *